United States Patent
Klessig et al.

(10) Patent No.: US 8,599,716 B2
(45) Date of Patent: Dec. 3, 2013

(54) METHOD AND SYSTEM TO CONFIGURE QUALITY OF SERVICE IN A NETWORK

(75) Inventors: Robert W. Klessig, Los Altos Hills, CA (US); Vijayakumar Raghavendran, Cary, NC (US)

(73) Assignee: Cisco Technolgy, Inc., San Jose, CA (US)

( * ) Notice: Subject to any disclaimer, the term of this patent is extended or adjusted under 35 U.S.C. 154(b) by 828 days.

(21) Appl. No.: 11/428,223

(22) Filed: Jun. 30, 2006

(65) Prior Publication Data
US 2008/0002678 A1  Jan. 3, 2008

(51) Int. Cl.
 *H04J 1/16* (2006.01)
 *H04L 12/66* (2006.01)
 *H04J 3/16* (2006.01)

(52) U.S. Cl.
 USPC .......................... 370/253; 370/356; 370/468

(58) Field of Classification Search
 None
 See application file for complete search history.

(56) References Cited

U.S. PATENT DOCUMENTS

| | | | | |
|---|---|---|---|---|
| 6,587,433 B1* | 7/2003 | Borella et al. | | 370/230 |
| 6,910,074 B1* | 6/2005 | Amin et al. | | 709/227 |
| 2002/0194369 A1* | 12/2002 | Rawlins et al. | | 709/238 |
| 2005/0160180 A1* | 7/2005 | Rabje et al. | | 709/238 |
| 2006/0164978 A1* | 7/2006 | Werner et al. | | 370/229 |

OTHER PUBLICATIONS

Metro Ethernet Forum, "Ethernet Local Management Interface (E-LMI)," Technical Specification, MEF 16, Jan. 2006, 41 pages.*

* cited by examiner

*Primary Examiner* — Melanie Jagannathan
(74) *Attorney, Agent, or Firm* — Schwegman Lundberg & Woessner, P.A.

(57) ABSTRACT

A system and method to automatically configure packet classification at a customer edge network device connecting a customer network to a service provider network. The method may comprise accessing the IP header of a packet received from the customer network to identify a customer service level classification of the packet. A memory may be accessed to retrieve service provider packet classification data identifying classes of service provided to the customer network. The packet classification of the service provider with the associated customer classification is associated and mapped, whereafter the Ethernet header of the packet may be populated with the mapped service provider packet classification.

18 Claims, 6 Drawing Sheets

| Application | L3 Classification | | Customer L2 PCP | Service Provider L2 PCP |
|---|---|---|---|---|
| | PHB | DSCP | | |
| Voice | EF | 46 | 5 | 5 |
| Call Signaling | AF31 -> CS3* | 26 -> 24 | 3 | 3 |
| Mission-Critical Data | CS6 | 20 | 2 | 3 |
| Transactional Data | AF21 | 18 | 2 | 3 |
| Network Management | CS2 | 16 | 2 | 3 |
| Bulk Data | AF11 | 10 | 1 | 3 |
| Scavenger | CS1 | 8 | 1 | 0 |
| Best Effort | 0 | 0 | 0 | 0 |

81 — 82 — 83 — 80

METHOD AND SYSTEM TO CONFIGURE QUALITY OF SERVICE IN A NETWORK

FIELD

This application relates to a method and system to configure Quality of Service in a network.

BACKGROUND

A Wide Area Network (WAN) is a large computer network that usually spans a large geographical area, such as a campus, city, country, and even world. A wired or wireless infrastructure or optical fiber connections may be used for connecting to a WAN. Technologies that may be used in WANs are ATM (Asynchronous Transfer Mode), FDDI (Fiber-Distributed Data Interface) and SMDS (Switched Multi-megabit Data Services), although these older technologies are being replaced by Ethernet-based technologies, e.g. Metro Ethernet.

Metro Ethernet is accordingly a computer network based on the Ethernet standard covering a wide area. Frequently, a metro Ethernet connects subscribers and businesses to a higher layer service such as the Internet.

A typical service provider metro Ethernet network is a collection of Layer 2 or 3 switches or routers connected through wireless infrastructure or optical cable, with the metro Ethernet network typically having a ring, hub-and-spoke, full mesh or partial mesh topology.

DiffServ or differentiated services is a method of providing quality of service on large networks such as MANs. DiffServ deals with bulk flows of data rather than single flows and single reservations. Typically a single negotiation will be made for the transfer of packets from a single customer or subscriber. Service level agreements (SLAs) are the contracts which specify what classes of traffic (classes of service) will be provided by a service provider, the guarantees needed for each class, and the amount of data to be sent for each class.

When data packets enter a DiffServ network, the attached device, e.g., host or router, classifies the data packet and sets the DSCP accordingly. For example, the customer edge router may set the "type of service" or "class of service" field, typically called the Differentiated Service Code Point or DSCP in the IP header according to the class of the data, with better classes typically receiving higher numbers.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
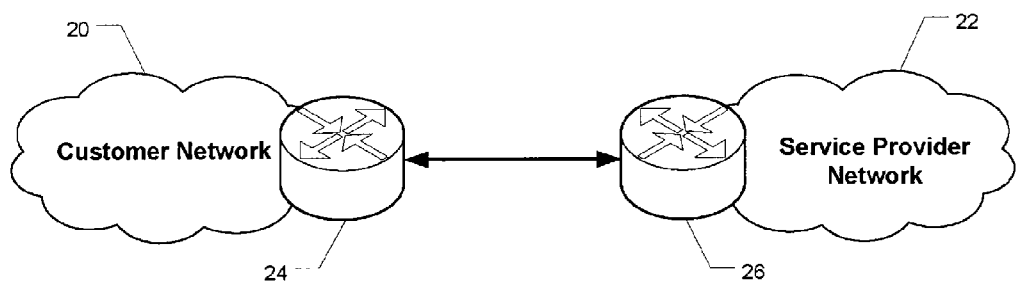
FIG. 1 shows a simplified diagram illustrating a connection between a customer network and a service provider network in accordance with an example embodiment.

Referring to FIG. 1 a network configuration between a customer network 20 and service provider network 22 is shown. The customer network 20 has at its edge a customer edge (CE) network device 24, such as a customer edge router which connects the customer network 20 to a service provider edge (PE) network device 26, such as a service provider edge router.

Edge devices typically provide entry points into enterprise or service provider core networks. For example, it may be used to connect Ethernet and token ring local area networks (LANs) to ATM networks. One of the functionalities of edge devices is to provide a priority to a received packet based on the nature of the packet. For example, a voice packet may receive a higher priority than a data packet or network management packet. The customer edge router may therefore set a "type of service" or "class of service" field, e.g. the Differentiated Service Code Point or DSCP in the IP header according to the class of service of the data. This may be used by the service provider edge device 26 to determine how the data packets are to be queued and forwarded (e.g., providing a particular priority to the packet).

The way in which data is to be forwarded (e.g., the priority of the data packet) may be determined by a service level agreement (SLA) between the customer network 20 and the service provider network 22. As mentioned above, the SLA may specify different classes of traffic to be provided by the service provider network, guarantees for each class, and the amount of data to be sent. The SLA accordingly may specify the details of the Ethernet virtual connection (EVC) which is purchased by the customer network.

Ethernet Local Management Interface protocol or E-LMI protocol may be used for enabling the customer edge network device 24 to request and receive service attribute information from a service provider metro Ethernet network so that the customer edge network device 24 may configure itself to access the metro Ethernet services. This information typically specifies the E-LMI to contain EVC and User Network Interface (UNI) status information.

Figure 2:
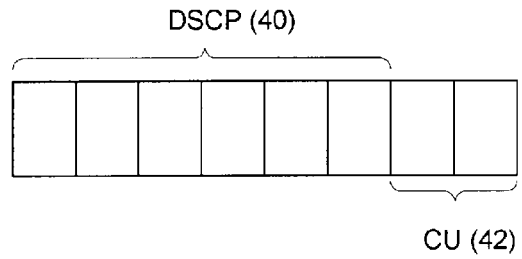
FIG. 2 shows the Differentiated Services (DS) field, with a Differentiated Services Code Point (DSCP)

The Differentiated Services Field Definition is a replacement header field which is intended to supersede the existing definitions of the IPv4 Type of Service (ToS) octet and the IPv6 Traffic Class octet. The field, as shown by reference 40 in FIG. 2, comprises six bits used as a code point, the DSCP 40, which is used to select the per-hop behavior a packet experiences at each node. A two-bit currently unused field (CU) 42 is reserved for later usage. The per-hop behavior (PHB) is a description of the externally observable forwarding treatment applied at a differentiated services-compliant node.

The first three bits of the DSCP typically corresponds with the IP precedence three bits used in the ToS Byte (the class). The last three bits of the DSCP further clarifies the definitions, offering finer granularity, fore example the drop probability.

Examples of per-hop behavior groups are Assured Forwarding (AF) and Expedited Forwarding (EF).

According to RFC 2597 the assured forwarding (AF) PHB describes AF as a means for a provider DS domain to offer different levels of forwarding assurances for IP packets received from a customer DS domain. There are four AF classes, AF1x to AF4x, and within each class there are three drop probabilities. Depending on a network's policy, packet can be selected for a PHB based on required throughput, delay, jitter, loss or according to priority of access to network services.

The following table illustrates the DSCP coding for specifying the AF class.

| Drop | Class 1 | Class 2 | Class 3 | Class 4 |
|---|---|---|---|---|
| Low | 001010<br>AF11<br>DSCP 10 | 010010<br>AF21<br>DSCP 18 | 011010<br>AF31<br>DSCP 26 | 100010<br>AF41<br>DSCP 34 |
| Medium | 001100<br>AF12<br>DSCP 12 | 010100<br>AF22<br>DSCP 20 | 011100<br>AF32<br>DSCP 28 | 100100<br>AF42<br>DSCP 36 |
| High | 001110<br>AF13<br>DSCP 14 | 010110<br>AF23<br>DSCP 22 | 011110<br>AF33<br>DSCP 30 | 100110<br>AF43<br>DSCP 38 |

Figure 3:
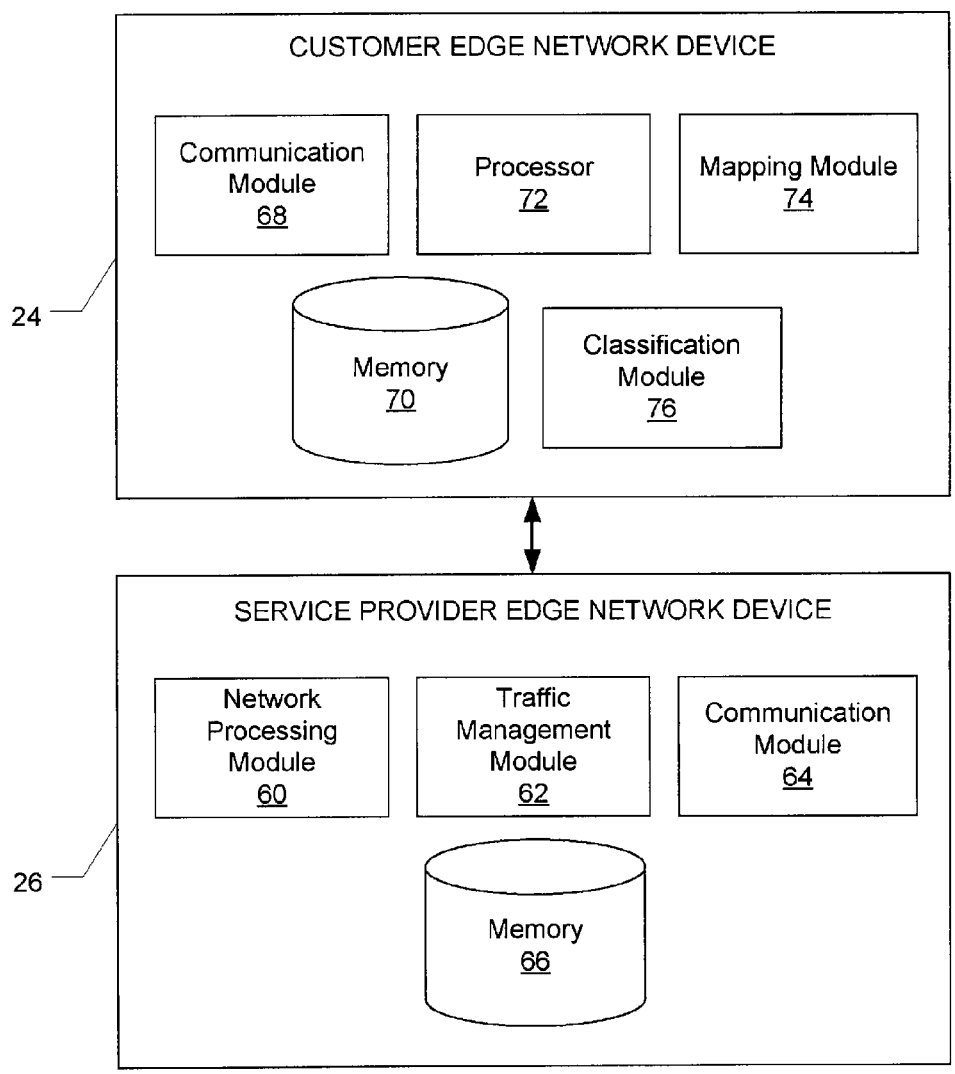
FIG. 3 is a block diagram illustrating a customer edge network device and a service provider edge network device in accordance with an example embodiment.

Turning to FIG. 3, block diagrams, in accordance with an example embodiment, of the service provider edge network device 26 connected to the customer edge network device 24 are shown.

The service provider edge network device 26 includes a network processing module 60 and traffic management module 62. The network processing module 60 feeds data packets received from other network devices to the traffic management module 62.

The traffic management module 62 may be responsible for controlling the processing of packets, controlling the order of processing of packets and the buffering of packets. The traffic management module 62 may accordingly assess the priority of a packet according to the DSCP of the packets. For example, a packet which has a class of service (CoS) which requires a high level of priority would be placed in the highest priority queue, to be serviced first or at least before packets having a lower priority. The traffic management module 62 may identify the priority of each packet, place the packet in an appropriate queue and then service and process the queues in the correct order.

The service provider edge network device 26 further includes memory 66 to store data relating to a service level agreement (SLA) between the customer network 20 and the service provider network 22. The SLA data may include the classes of service available to the customer network 20 and may be obtained or retrieved by the service provider edge network device 26 from a management server on the service provider network 22. For example, a specific service provider network may provide 3 classes of service, such as Gold (high level service, typically used for VoIP), Silver (medium level service, typically used for Call Signaling, Mission Critical Data, Transactional Data and Network Management) and Bronze (low level service, typically used for Bulk Data, Scavenger and Best Effort). However, due to the customer's specific requirements, the customer may decide to only contract two of these services, such as Silver and Bronze.

The service provider edge network device 26 may also include a communication module 64 which automatically provides the customer edge network device 24 with service provider packet classification relating to the classes of service available to the customer network 20. The packet classification may include packet classification identifiers and classification parameters, which will be described by way of example in more detail below.

The packet classification may be provided to the customer edge network device through a protocol. In an example embodiment, in the Ethernet environment the E-LMI may be used, via extensions to the Metro Ethernet Forum standard E-LMI, to enable the customer edge network device 24 to request and receive service attribute information from the metro Ethernet network. The packet classification data may therefore be included in the E-LMI or in similar protocols.

The communication module 64 also receives the packet data from the customer edge network device 24 for processing, management and distribution by the different service provider network devices.

The customer edge network device 24 includes a communication module 68 to communicate with the customer network and with the service provider edge network device 26, in particular to transfer data packets for further distribution over the EVC of the customer network.

A memory 70 stores the service provider packet classification data related to the classes of service provided to the customer network. This data is received from the service provider edge network device 26 and is used in mapping classification data across the customer network and service provider network.

The customer edge network device 24 further includes a processor 72 to access the IP header of a packet received from the customer network 20, thereby to identify the customer's packet classification of classes of service. The processor 72 may also access the memory 70 to retrieve service provider packet classification data in relation to classes of service provided to the customer network 20.

A mapping module 74 may, in response to retrieving the customer's packet classification and service provider packet classification, identify the service provider packet classification associated with the customer classification and automatically correlate (or map) the packet classification of the service provider with the associated customer classification. Thus, in an example embodiment, mapping of service levels may take place at a customer edge network device as opposed to mapping at a provider edge network device.

A classification module 76 of the customer edge network device 24 may populate the IP header of the packet received with the mapped service provider packet classification, which enables the service provider edge network device 26 to accurately and efficiently deal with data packets received from the customer edge network device 24, in accordance with the SLA between the customer network and the service provider network.

Figures 4, 5:
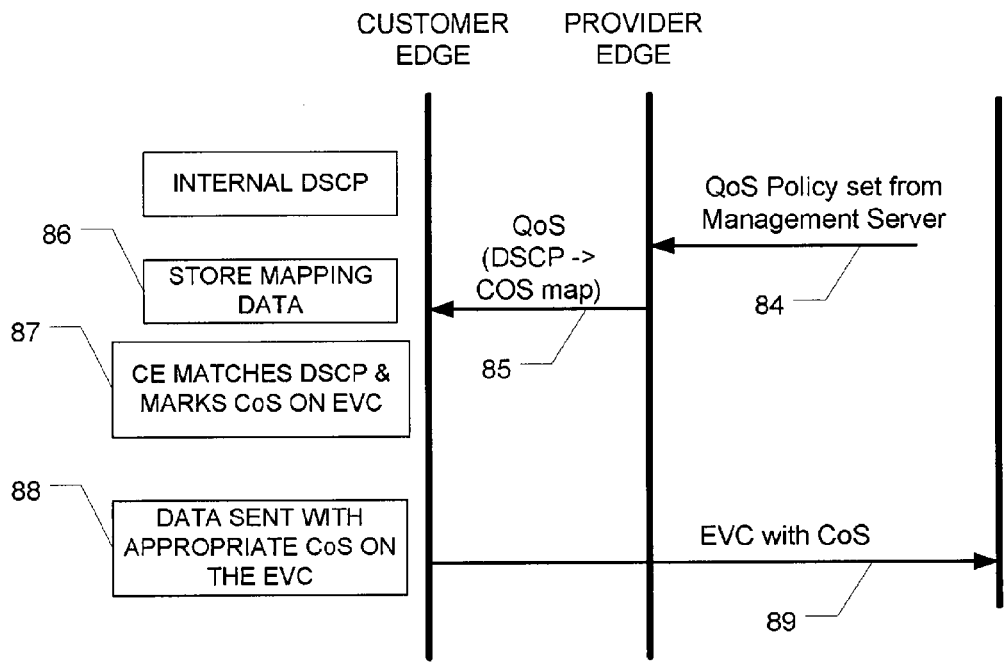
FIG. 4 shows an example of a table associating a classification of classes of service of a customer network with a classification of classes of service of a service provider, in accordance with an example embodiment.
FIG. 5 shows an interaction diagram of the flow of information relating to automatic configuration of QoS in a network in accordance with an example embodiment.

FIG. 4 shows an example table of the classification of classes of service associated with a customer network (e.g., the customer network 20) mapped to a classification of classes associated with a service of the service provider network (e.g., the network 22).

The last column 80 provides the classification of the classes of available service in the service provider network. The example classification identifiers "5", "3" and "0" each refer to a PCP for a different class of service and must be linked to the Level 3 classification provided in the per-hop behavior column 81 and the DSCP value column 82 by the customer edge network device 24. The illustrated Level 3 classifications are classification parameters defined in terms of data types.

As shown by way of example, the service provider class of service "5" relates to Voice, class of service "3" relates to Call Signaling, Mission Critical Data, Transactional Data and Network Management and Bulk Data, while class of service "0" relates to Scavenger and Best Effort. It should be noted that these mappings are merely by way of example and that other mappings may be provided.

The customer is shown by way of example to have defined 5 classes of service (see column 83) in the customer network 20. In particular in the given example class of service DSCP=46 relates to Voice, class of service DSCP=26->24 relates to Call Signaling, class of service DSCP=16, 18, 20 relates to Mission Critical Data, Transactional Data and Network Management, class of service DSCP=8, 10 relates to Bulk Data and Scavenger, and class of service DSCP=0 relates to Best Effort. In other embodiments, more or less classes of service may be provided and associated with different applications.

The classification data provided by the service provider edge network device may include the Level 3 classification and identify a corresponding service provider layer 2 classification. This data forms a structure or convention, typically as part of the E-LMI, which allows the characterization of the classes of service by the service provider, enabling the customer network to identify the association between the service provider classes of service classification and the customer classes of service classification, thereby to automatically map them at the customer edge network device. This allows the classification module 76 to populate the Ethernet header of any of the packets prior to the customer edge network device 24 transmitting the packets to the service provider edge network device and the EVC. Accordingly, when the provider edge network device 26 received the packet it has already been associated with a CoS corresponding to the service provider network 22.

FIG. 5 shows an interaction chart of communications between a customer edge network device (e.g., the customer edge network device 24) and a service provider network, for example, the service provider edge network device 26 in accordance with an example embodiment.

In the example embodiment, the service provider edge network device may retrieve data relating to the SLA between the customer network and the service provider network from a service provider management server (see arrow 84). This information is, in turn, used to provide the customer edge network device, through the E-LMI, with the service provider classification of classes of service, which may include classification identifiers and parameters (see arrow 85). The mapping information is then stored on the customer edge network device (see block 86).

When the customer edge network device sends packets to the provider edge network device, the customer edge network device 24 matches the classification data of the service provider with that of data packets to be sent on the EVC (see block 87) and the data packets are then sent with the appropriate classification of the classes of service for the EVC (see block 89).

Figure 6:
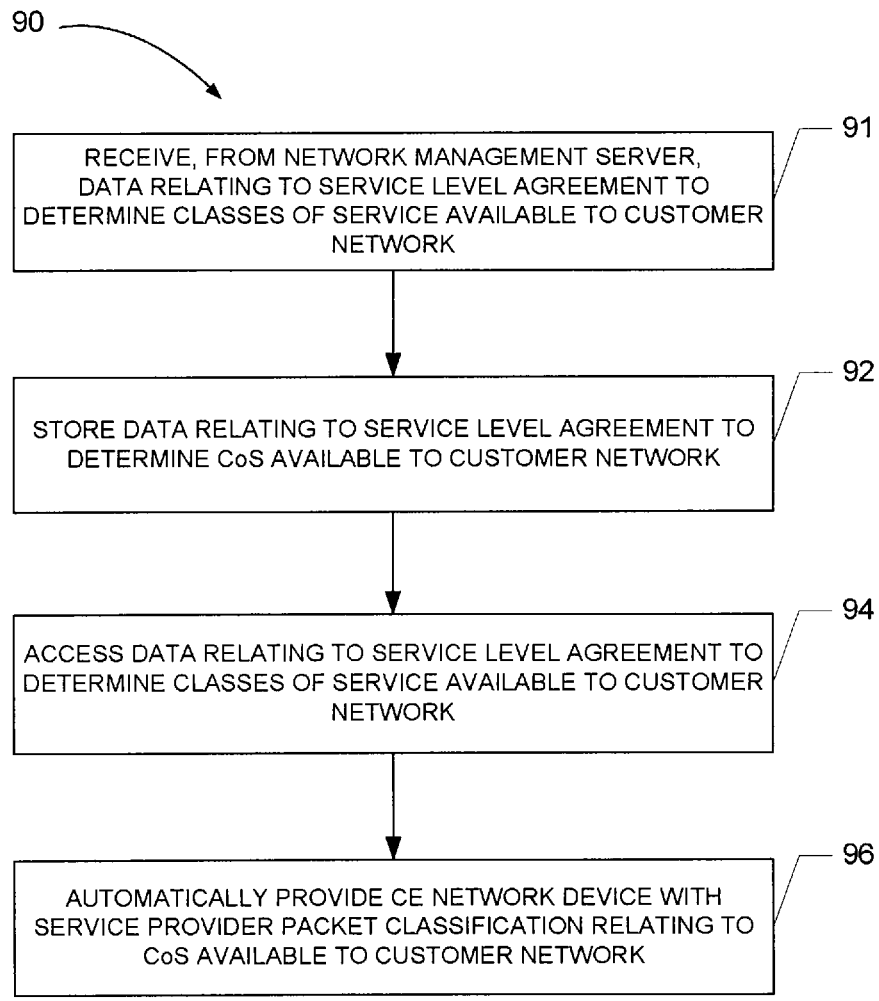
FIG. 6 is a simplified flow diagram illustrating a method to enable the configuration of packet classification at a customer edge network device connecting a customer network to a service provider network in accordance with an example embodiment.

Turning to FIG. 6, a flow diagram shows an example method 90 for enabling the configuration of packet classification at a customer edge network device 24 connecting a customer network 20 to a service provider network 22. The example method 90 may be performed by the service provider edge network device 26.

In block 91, data relating to a service level agreement (SLA) between the customer network 20 and the service provider network 22 is optionally received from a network management server and stored, in block 92 in a memory 66.

The service provider edge network device (e.g., provider edge router) may access this data in block 94 to determine the classes of service available to the service provider network 22; and the communication module 64 may automatically provide the customer edge network device 24 (e.g., a customer edge router) with service provider packet classification data relating to these classes of service available to the customer network (block 96). As mentioned above, the data is provided to the customer edge network device 24 using, for example, an Ethernet local management interface (E-LMI) protocol.

Figure 7:
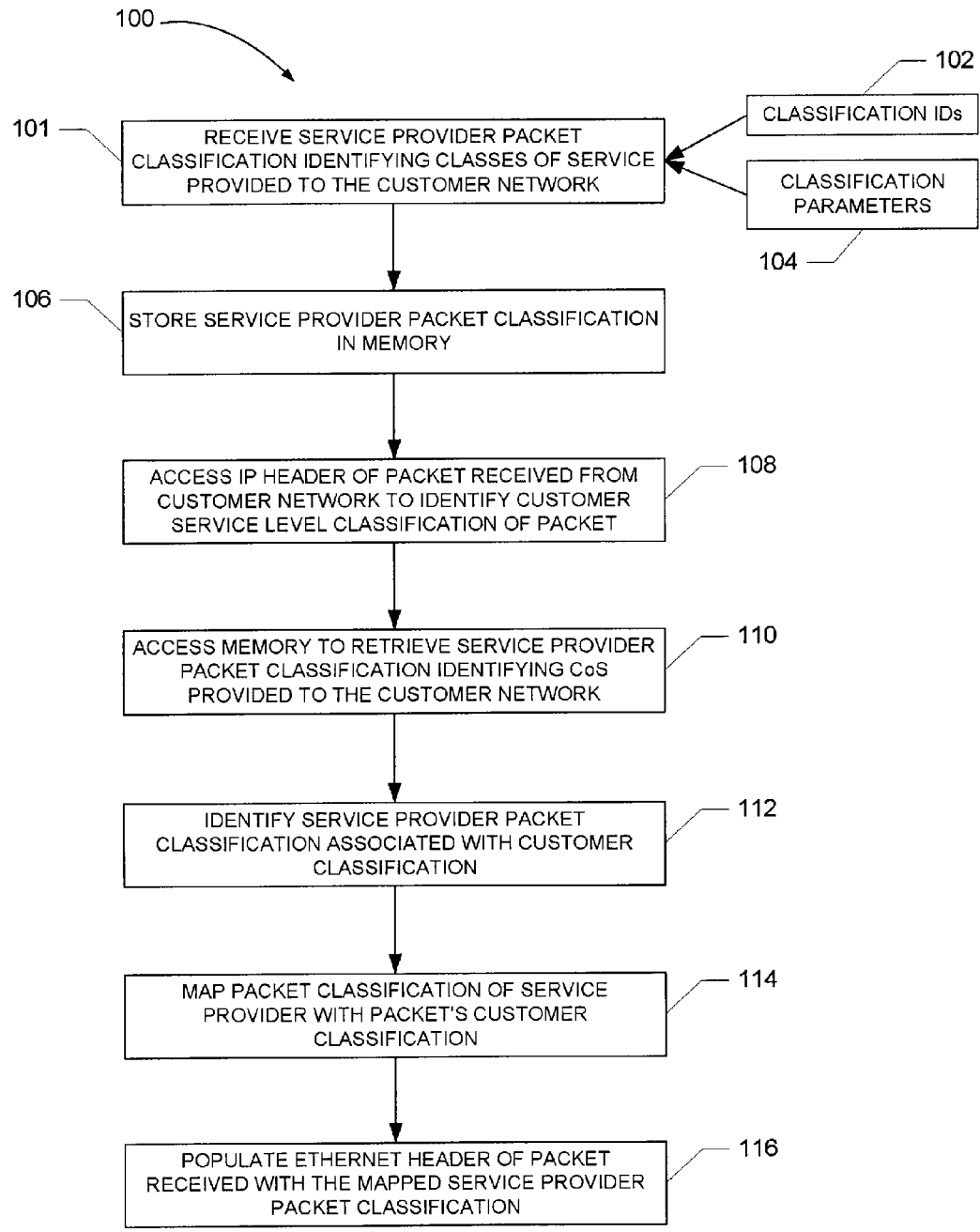
FIG. 7 is a simplified flow diagram illustrating a method for automatically configuring packet classification at a customer edge network device connecting a customer network to a service provider network in accordance with an example embodiment.

FIG. 7 shows a flow diagram of a method 100, in accordance with an example embodiment, for automatically configuring packet classification at a customer edge network device 24 that connects a customer network (e.g., the customer edge network 20) to a service provider network (e.g., a service provider edge network 26). The method 100, as illustrated by way of example, may be performed by the customer edge network device 24, which is in communication with the service provider edge network device 26.

In block 101, the customer edge network device 24 receives service provider packet classification data, e.g. classification identifiers 102 and classification parameters 104, relating to the classes of service available to the customer network 20 from the service provider edge network device 26. The classification parameters may, for example, relate to a packet's differentiated service code point (DSCP) or per-hop behavior (PHB). The service provider packet classification data may be received via Ethernet local management interface (E-LMI) protocol.

The packet classification data which, as herein before described, may map a CoS associated with a customer network with a CoS associated with a service provider network and this (or other mapping data) may be stored in memory 70 (see block 106).

The communication module 68 may access the IP header of a packet received from within the customer network 20, which is to be sent over the EVC, thereby to identify a customer service level classification of the packet (block 108).

In block 110, the communication module 68 further accesses the memory 70 to retrieve the service provider packet classification data identifying the classes of service provided to the customer network.

The processor 72 may identify a service provider packet classification which is associated with the customer classification of the packet (block 112) and map the packet classification of the service provider with the associated customer classification (block 114). In block 116, the mapping module 74 may populate the Ethernet header for the received packet with the mapped service provider packet classification, thereby automatically providing it with the necessary quality of service information for it to be transmitted over the EVC of the customer and the metro Ethernet network with the appropriate quality of service.

Figure 8:
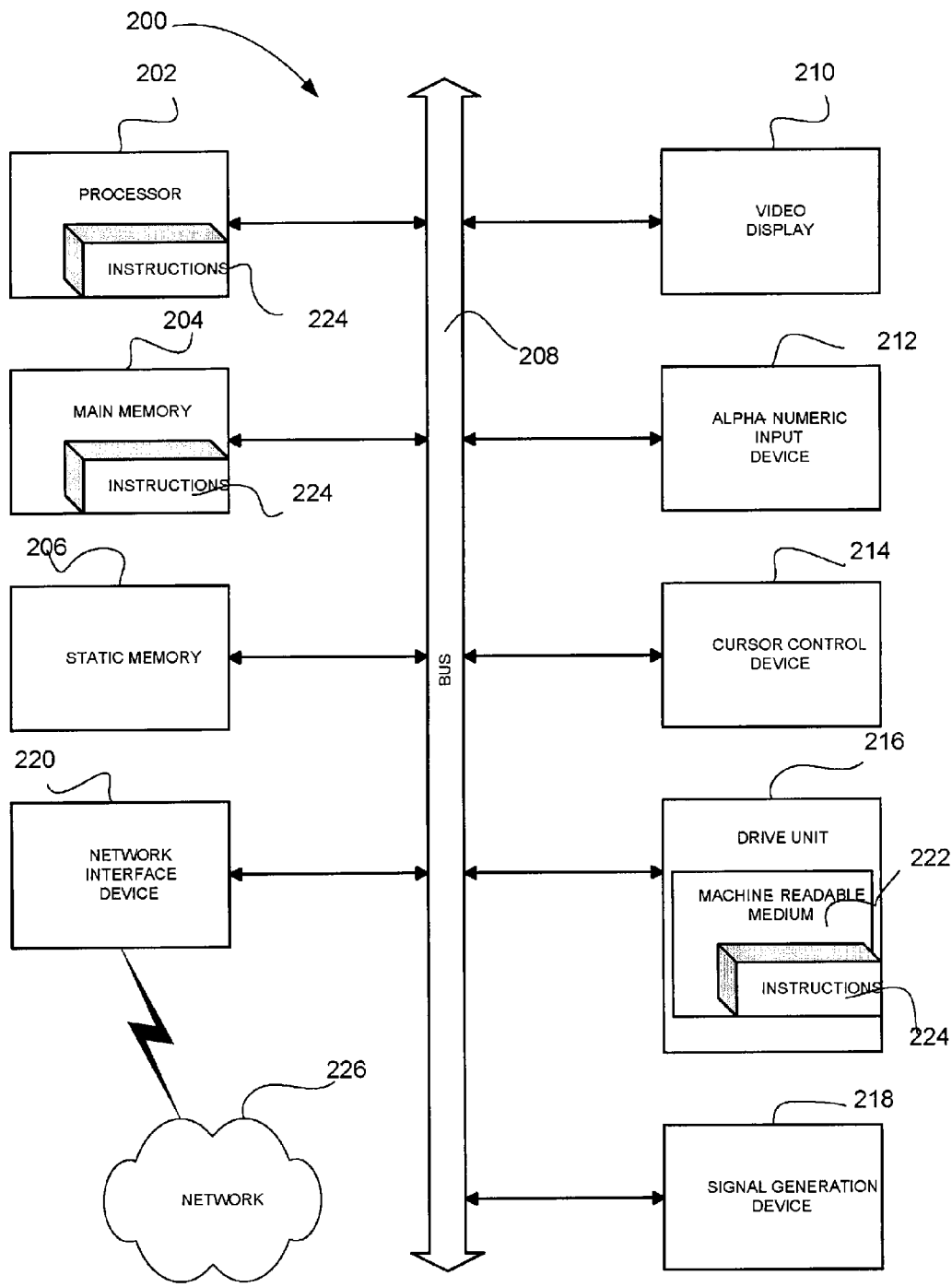
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising at a provider edge network device forming part of a provider edge network:

accessing service provider packet classification data relating to a service level agreement between a customer network and the service provider network to determine classes of service available to the customer network on the service provider network in accordance with a service provider classification scheme that defines a plurality of service provider classifications corresponding to respective data types;

in an automated operation using one or more processors, transmitting the service provider packet classification data to the customer network for storage in a memory on a customer edge network device to facilitate mapping a service provider classification to a customer classification at the customer edge network device, the customer classification being in accordance with a customer network classification scheme which is different from the service provider classification scheme and which defines a plurality of customer classifications for respective data types; and receiving a packet from the customer edge network device, an Ethernet header of the packet being populated with the mapped service provider classification.

2. The method of claim 1, further comprising transmitting the packet over an Ethernet Virtual Connection (EVC) based on the Ethernet header of the packet.

3. The method of claim 1, wherein the transmitting of the service provider packet classification data comprises communicating the service provider packet classification data relating to the classes of service available to the customer network using an Ethernet local management interface (E-LMI) protocol.

4. The method of claim 3, wherein the service provider packet classification data includes classification identifiers and parameters associated with different types of data applications.

5. A method comprising, a customer edge network device forming part of a customer network;

accessing an IP header of a packet received from within a customer network to identify a customer classification associated with the packet in accordance with a customer network classification scheme that defines a plurality of customer classifications for respective data types;

accessing a memory to retrieve service provider packet classification data identifying classes of service available to the customer network on a service provider network in accordance with a service provider classification scheme that defines a plurality of service provider classifications corresponding to respective data types, the service provider classification scheme being different from the customer network classification scheme;

mapping a particular service provider classification to the identified customer classification based at least in part on the service provider packet classification data;

providing the packet with the mapped service provider classification at the customer edge network device by populating a header of the packet with an identifier of the mapped service provider classification; and sending the packet from the customer edge network device to the service provider network.

6. The method of claim 5, further comprising:

at the customer edge network device, receiving the service provider packet classification data relating to the classes of service available to the customer network from a service provider edge network device; and storing the service provider classification data in memory at the customer edge network device.

7. The method of claim 6, which comprises communicating the service provider packet classification data relating to the classes of service available to the customer network using an Ethernet local management interface (E-LMI) protocol.

8. The method of claim 7, wherein the service provider packet classification data includes classification identifiers and parameters associated with different types of data applications.

9. The method of claim 8, wherein the classification parameters relate to a packet's differentiated service code point (DSCP) or per-hop behavior (PHB).

10. A provider edge network device comprising:

memory store service provider packet classification data relating to a service level agreement between a customer network and the service provider network, the provider edge network device being to connect the service provider network to a customer edge network device of the customer network, the service provider packet classification data indicating classes of service available to the customer network in accordance with a service provider classification scheme that defines a plurality of service provider classifications corresponding to respective data types; and a communication module to automatically provide the customer edge network device with the service provider packet classification data to facilitate mapping a service provider classification to a customer classification at the customer edge network device, the customer classification being in accordance with a customer network classification scheme which is different from the service provider classification scheme and which defines a plurality of customer classifications for respective data types, and to receive a paCket from the customer edge network device, an Ethernet header of the packet having been populated at the customer edge network device with the mapped service provider classification.

11. The provider edge network device of claim 10, wherein the communication module is further to transmit the packet over an Ethernet Virtual Connection (EVC) based on the Ethernet header of the packet.

12. The provider edge network device of claim 10, wherein the communication module is configured to use an Ethernet local management interface (E-LMI) protocol to provide service provider packet classification data relating to classes of service available.

13. The provider edge network device of claim 12, wherein the service provider packet classification data comprises classification identifiers and parameters associated with different types of data applications.

14. A customer edge network device comprising:

memory to store service provider packet classification data identifying service provider classes of service available to a customer network on a service provider network in accordance with a service provider classification scheme that defines a plurality of service provider classifications corresponding to respective data types, the customer edge network device being to connect the customer network to a service provider edge network device of the service provider network; and one or more processors to:

access the IP header of a packet received from within the customer network to identify a customer classification associated with the packet in accordance with a customer network classification scheme that defines a plurality of customer classifications for respective data types, the service provider classification scheme being different from the customer network classification scheme;

access the service provider packet classification data in the memory to identify a service provider classification associated with the customer classification, the packet classification data used in mapping the service provider classification to the customer classification; and populate an Ethernet header of the packet with the mapped service provider classification.

15. The customer edge network device of claim 14, wherein the one or more processors are configured to:

receive the service provider packet classification data relating to the classes of service available to the customer network from the service provider edge network device; and store the service provider packet classification data in the memory at the provider edge network device.

16. The customer edge network device of claim 15, which comprises a communication module to receive the service provider packet classification data relating to the classes of service available to the customer network via an Ethernet local management interface (E-LMI) protocol.

17. The customer edge network device of claim 16, wherein the service provider packet classification data includes classification identifiers and parameters associated with different types of data applications.

18. The customer edge network device of claim 17, wherein the classification parameters relate to a packet's differentiated service code point (DSCP) or per-hop behavior (PHB).

* * * * *